United States Patent
Krauss et al.

(10) Patent No.: US 7,695,249 B2
(45) Date of Patent: Apr. 13, 2010

(54) BEARINGLESS ROTOR BLADE ASSEMBLY FOR A HIGH SPEED ROTARY-WING AIRCRAFT

(75) Inventors: Timothy A. Krauss, Harwinton, CT (US); Pedro L. Cabrera, West Haven, CT (US); David H. Hunter, Cheshire, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 686 days.

(21) Appl. No.: 11/565,669

(22) Filed: Dec. 1, 2006

(65) Prior Publication Data

US 2008/0131280 A1 Jun. 5, 2008

(51) Int. Cl.
*B64C 27/32* (2006.01)
(52) U.S. Cl. .................................. 416/134 A; 416/226
(58) Field of Classification Search ............. 416/134 A, 416/148, 226
See application file for complete search history.

(56) References Cited

U.S. PATENT DOCUMENTS

| 4,403,918 A | * | 9/1983 | Schramm | .................... 416/138 |
| 4,580,945 A | | 4/1986 | Miller | |
| 4,616,977 A | | 10/1986 | Schramm | |

FOREIGN PATENT DOCUMENTS

| DE | 1169306 | 4/1964 |
| DE | 1275871 | 8/1968 |
| EP | 0086490 | 8/1983 |
| EP | 0141017 | 5/1985 |
| EP | 0288957 | 11/1988 |
| FR | 1084706 | 1/1955 |
| FR | 1305631 | 10/1962 |
| FR | 2374212 | 7/1978 |
| GB | 1189136 | 4/1970 |

OTHER PUBLICATIONS

PCT International Search Report and Written Opinion, mailed Feb. 11, 2009, International Application No. PCT/US2007/084394.

* cited by examiner

*Primary Examiner*—Richard Edgar
(74) *Attorney, Agent, or Firm*—Carlson, Gaskey & Olds PC

(57) ABSTRACT

A bearingless rotor system includes a flexbeam assembly having a first beam and a second beam arranged in a back-to-back orientation with a pitch shaft channeled therebetween. The beams morph into a rotor blade spar at an outboard rotor blade station. The outboard section of the flexbeam assembly receives the full pitch input from the pitch shaft while the most inboard section of the flexbeam assembly is essentially fixed in pitch by a blade attachment to a rotor hub assembly. The flexbeam assembly twist versus span is essentially linear from the most inboard to the most outboard rotor blade stations. The outboard rotor blade station, being attached to the outboard section of the flexbeam assembly, thereby also defines the pitch input equivalent from the outboard rotor blade station to the rotor blade tip.

18 Claims, 16 Drawing Sheets

US 7,695,249 B2

BEARINGLESS ROTOR BLADE ASSEMBLY FOR A HIGH SPEED ROTARY-WING AIRCRAFT

BACKGROUND OF THE INVENTION

The present invention relates to a bearingless rotor blade assembly of a rotary-wing aircraft, and more particularly to a flexbeam assembly having a first beam and a second beam with a pitch shaft channeled therebetween, the beams extend to a radial outboard station of the rotor blade at which the pitch shaft ends and the beams morph into a rotor blade spar.

Conventional rotary-wing aircraft have a forward airspeed limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Forward movement of the helicopter thereby generates a dissymmetry of lift between the advancing and retreating sides of the rotor. This dissymmetry may create an unstable condition if lift is not equalized across the advancing and retreating sides of the rotor.

A rotary wing aircraft with a contra-rotating rigid rotor system is capable of higher speeds compared to conventional single rotor helicopters due in part to the balance of lift between the advancing sides of the main rotor blades on the upper and lower rotor systems.

Aerodynamic drag associated with a rotary wing aircraft having a counter-rotating, coaxial rotor system is primarily due to the additional rotor hub and the interconnecting main rotor shaft assembly between the upper and lower rotor systems. For high-speed rotary wing aircraft, the increased drag resulting from the counter-rotating, coaxial rotor system may result in a relatively significant power penalty.

The aerodynamic drag of the dual counter-rotating, coaxial rotor system may be reduced by a rotor fairing system. Although effective, sealing compatibility of the rotor fairing system with the rotor blades may be complicated by a relatively thick inboard airfoil section typical of conventional flexbeam rotor systems having an airfoil shaped torque tube that surrounds a flexbeam which receive a pitch input. Sealing with the rotor fairing system may be further complicated by a rotor control system which provides a pitch input to each rotor blade at a location typically adjacent to the interface between the rotor fairing system and each rotor blade.

For a high speed counter-rotating, coaxial rotor system, the advance ratio is sufficiently high such that a significant part of the retreating blade is in reverse flow. Because of the large nose-up cyclic pitch on the retreating blade, the inboard section of the rotor blade has an angle of attack well beyond stall, producing significant negative lift and high drag force. The angle of attack beyond stall, flapping clearances, rotor control system pitch input clearances, and the relatively thick inboard airfoil all combine to complicate fairing system integration and result in degradation of the rotor system lift/drag ratio.

Accordingly, it is desirable to provide a rotor blade for a high speed rotary-wing aircraft flight envelope.

SUMMARY OF THE INVENTION

A bearingless rotor system according to the present invention includes a flexbeam assembly having a first beam and a second beam arranged in a back-to-back orientation with a pitch shaft channeled therebetween. The beams extend to an outboard rotor blade station at which the beams morph into a rotor blade spar within an outboard rotor blade section. Both the flexbeam assembly and the outboard rotor blade section are surrounded by an essentially contiguous outer aerodynamic skin which provides an aerodynamic surface, but minimizes torsional stiffness effect which may resist pitch change.

The outboard section of the flexbeam assembly reflects the full pitch input from the pitch shaft while the most inboard section of the flexbeam assembly is essentially fixed in pitch by a blade attachment to a rotor hub assembly. That is, the flexbeam assembly twist versus span is essentially linear from the innermost to the outermost station. The outboard rotor blade section extends from the flexbeam assembly and reflects the pitch input to the rotor blade tip.

The pitch shaft provides a direct pitch input into the flexbeam assembly at a relative soft section that replaces the heretofore required bulky torque tube with the outer aerodynamic skin which need not be much larger than the flexbeam assembly itself. This is especially advantageous in a high-speed rotary-wing aircraft in which the inboard sections of the retreating blades are in reverse flow such that having a non-pitching inboard blade section results in a thin, low-drag airfoil which is readily received in a sealed relationship with a rotor hub fairing system.

The present invention therefore provides a rotor blade for a high speed rotary-wing aircraft flight envelope.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
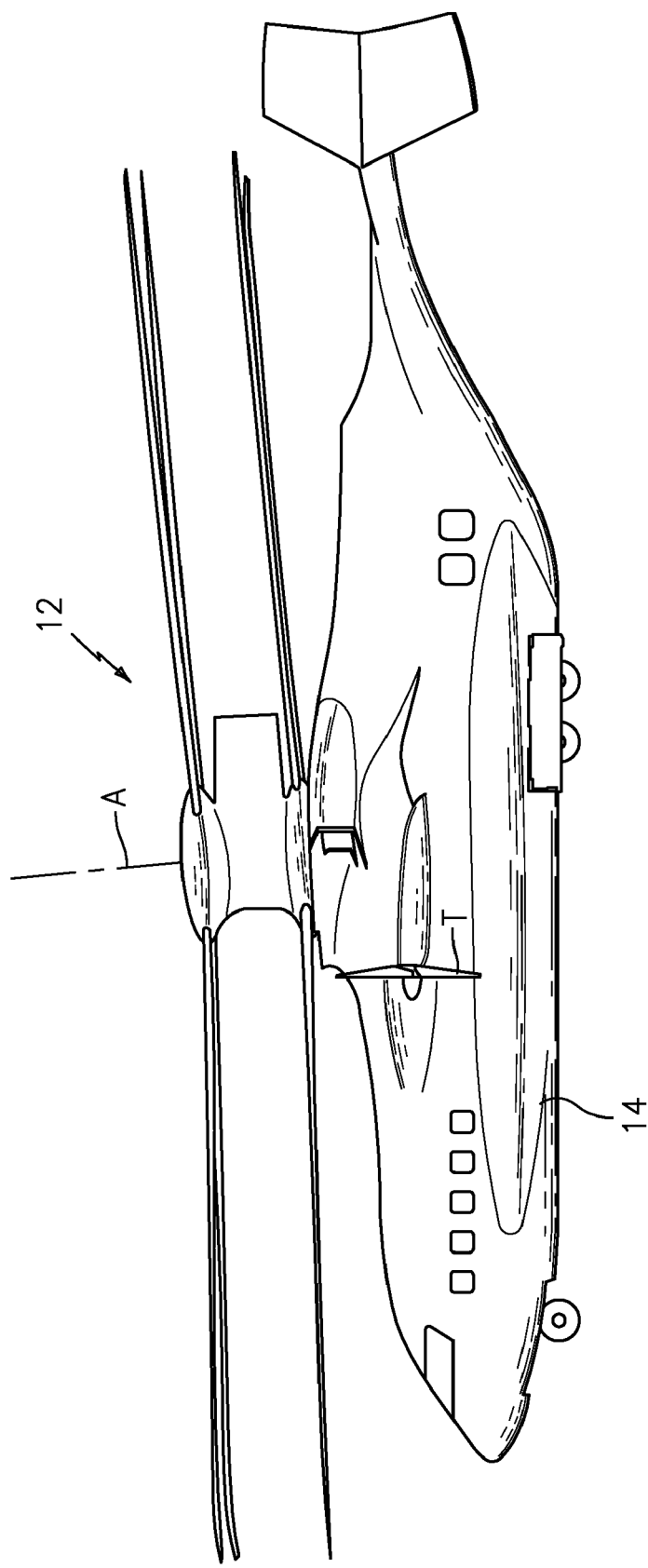
FIG. 1A is a general perspective side view of an exemplary dual, counter-rotating, coaxial rotor system rotary-wing aircraft embodiment for use with the present invention.
Figure 1B:
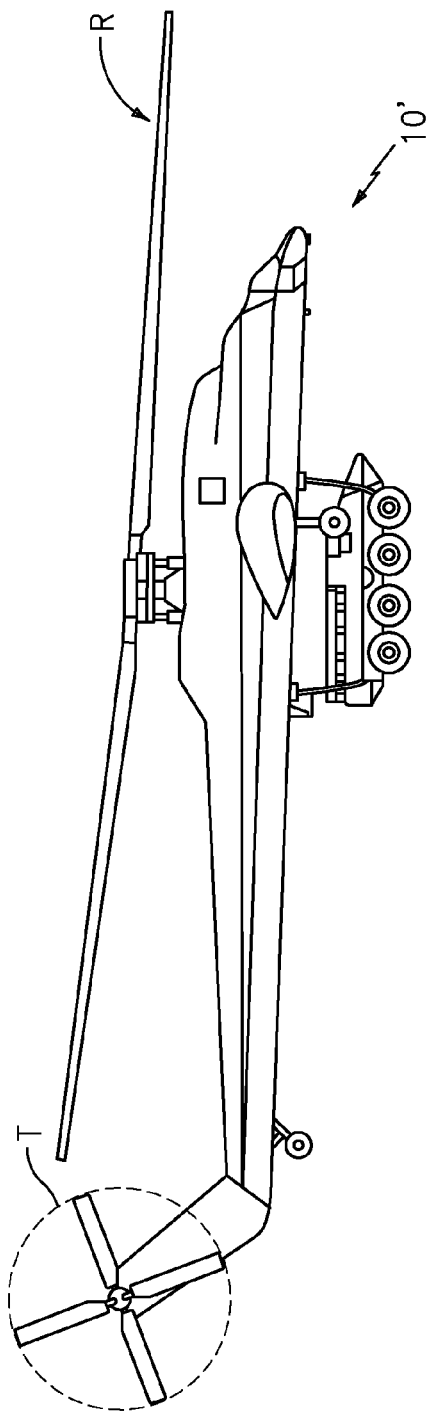
FIG. 1B is a general perspective side view of a crane type rotary-wing aircraft embodiment for use with the present invention.

FIG. 1A illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as a propulsive system T which provides translational thrust generally parallel to an aircraft longitudinal axis. Although a particular type rotary-wing aircraft configuration is illustrated in the disclosed embodiment, other aircraft such as single rotor flying crane helicopters 10' having a single main rotor assembly R and an anti-torque rotor T mounted to an extended tail (FIG. 1B), tilt-rotor and tilt-wing aircraft which utilize a servo-flap rotor control system will also benefit from the present invention.

Figure 2:
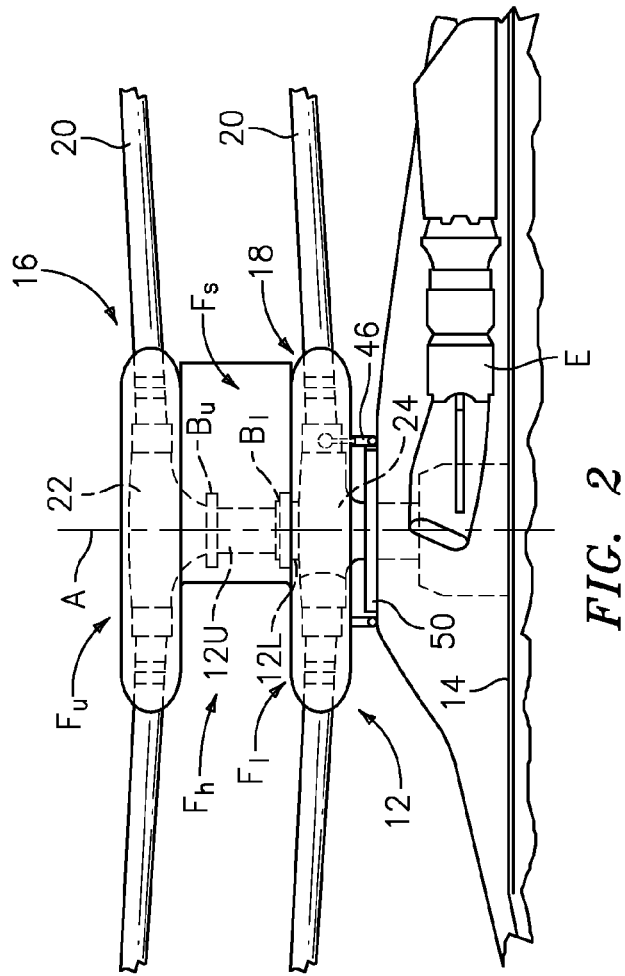
FIG. 2 is an expanded partial phantom view of a dual, counter-rotating, coaxial rotor system of the aircraft of FIG. 1A.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to each of an upper rotor hub assembly 22 and a lower rotor hub assembly 24 for rotation about the rotor axis of rotation A. It should be understood that any number of rotor blade assemblies 20 may be mounted to each rotor hub assembly 22, 24.

The rotor system 12 preferably includes a rotor hub fairing system Fh generally located between and around the upper and lower rotor systems 16, 18 such that the rotor hub assemblies 22, 24 are at least partially contained therein. The rotor hub fairing system Fh includes an upper hub fairing Fu, a lower hub fairing Fl and a shaft fairing Fs therebetween. The shaft fairing Fs is attached to the counter-rotating, coaxial rotor system 12 through a bearing arrangement Bu, Bl such that the shaft fairing Fs is aligned with the relative wind in forward flight but may be free to pivot during low speed maneuvering. The upper bearing Bu and the lower bearing Bl are respectively located adjacent an upper portion and a lower portion of the shaft fairing Fs. The upper bearing Bu is preferably attached to one rotor shaft 12U while the lower bearing Bl attached to the other rotor shaft 12L such that the bearings counter-rotate and net bearing drag is relatively low.

Figure 3A:
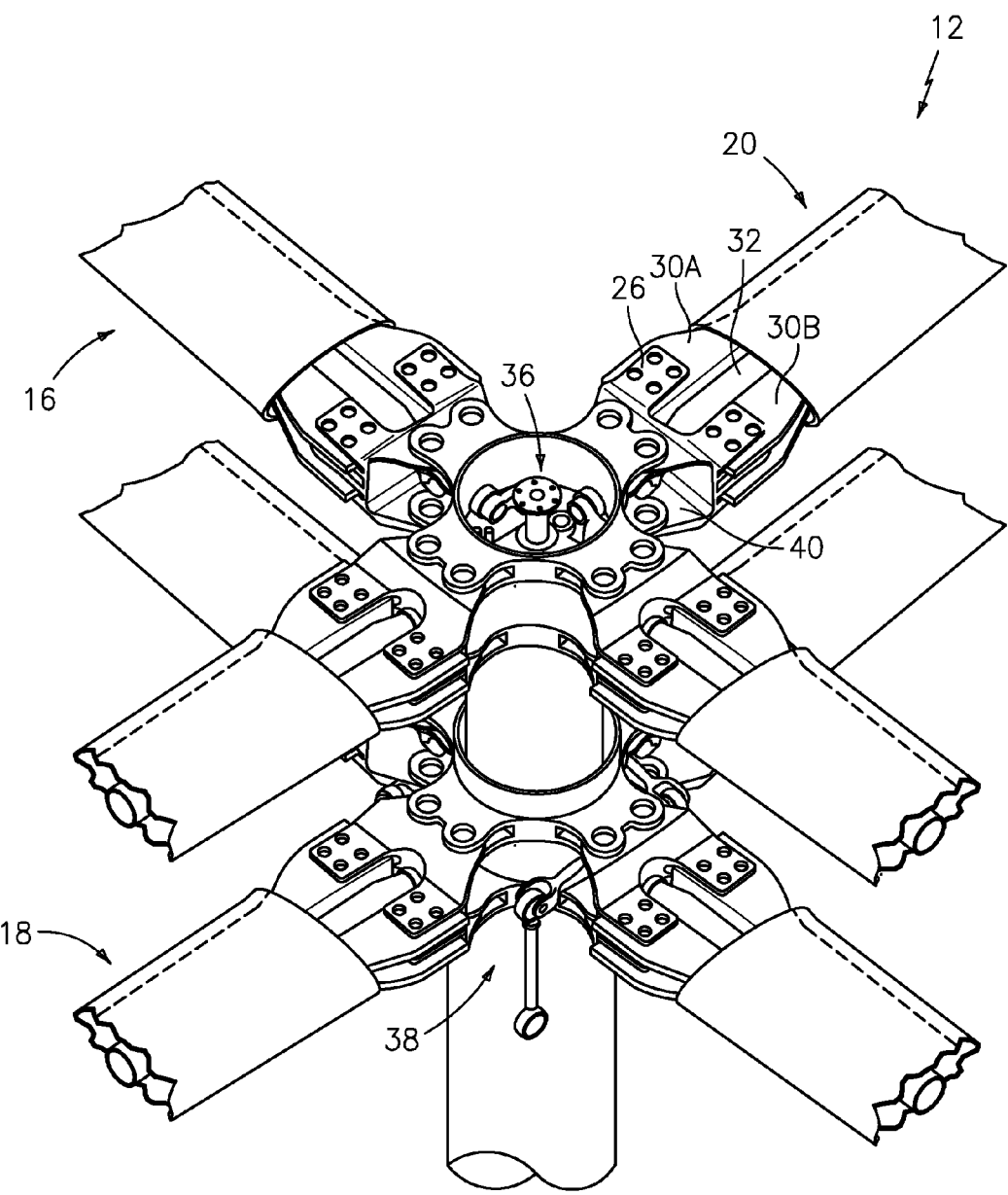
FIG. 3A is a perspective view of a dual, counter-rotating, coaxial rotor system in a flight position.
Figure 3B:
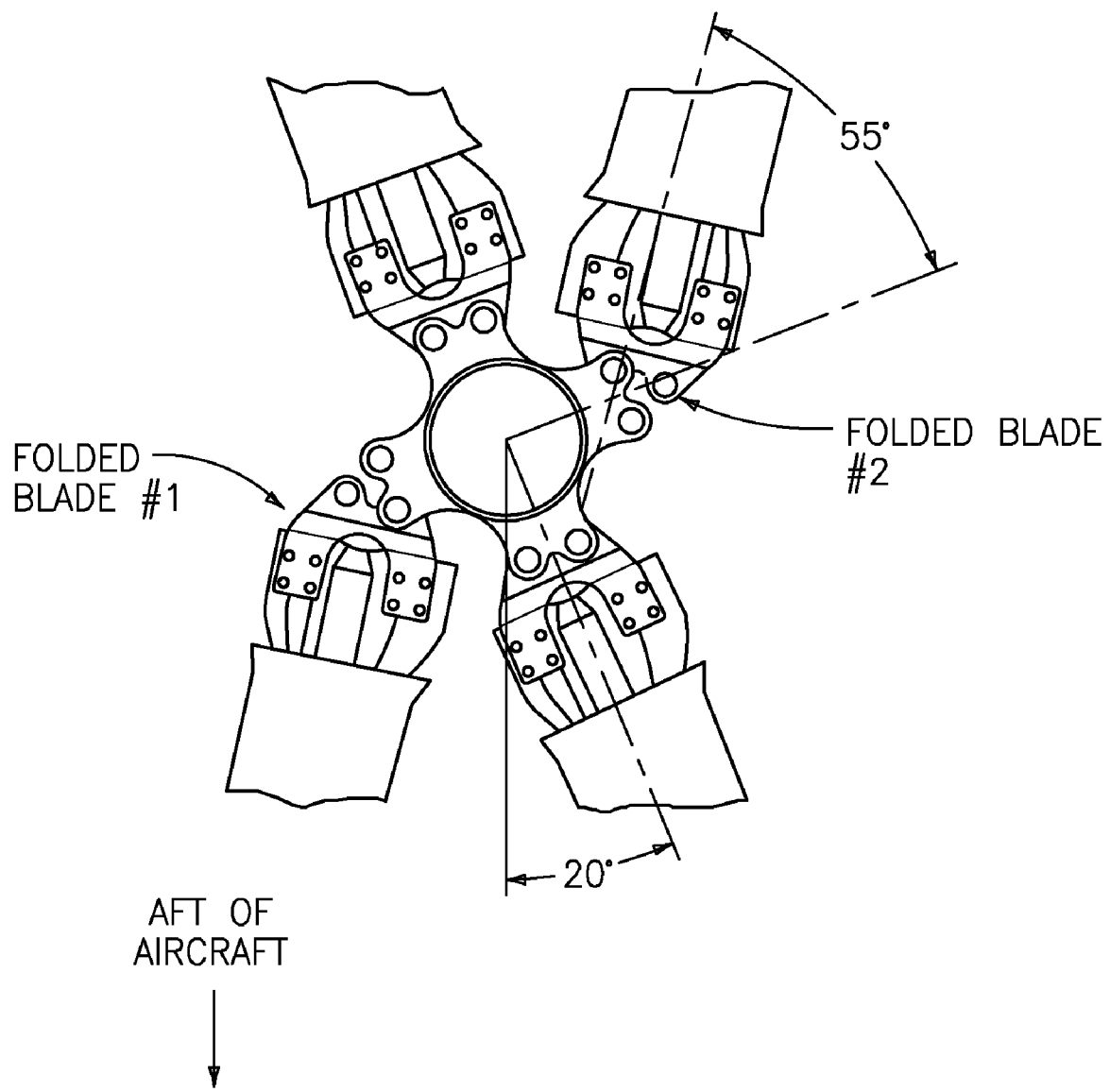
FIG. 3B is a perspective view of the dual, counter-rotating, coaxial rotor system in a folded position.

Referring to FIG. 3A, each rotor blade assembly 20 includes a blade attachment 26 which serves as the structural link to the rotor hub assembly 22, 24 and preferably permits blade fold (FIG. 3B). It should be understood that various blade fold attachments may also be utilized with the present invention. Each blade attachment 26 is mounted to a flexbeam assembly 28 having a first beam 30A and a second beam 30B arranged in a back-to-back orientation with a pitch shaft 32 channeled therebetween. The beams 30A, 30B preferably extend to 46% of the rotor radius at which the beams 30A, 30B morph into a rotor blade spar.

Figure 3C:
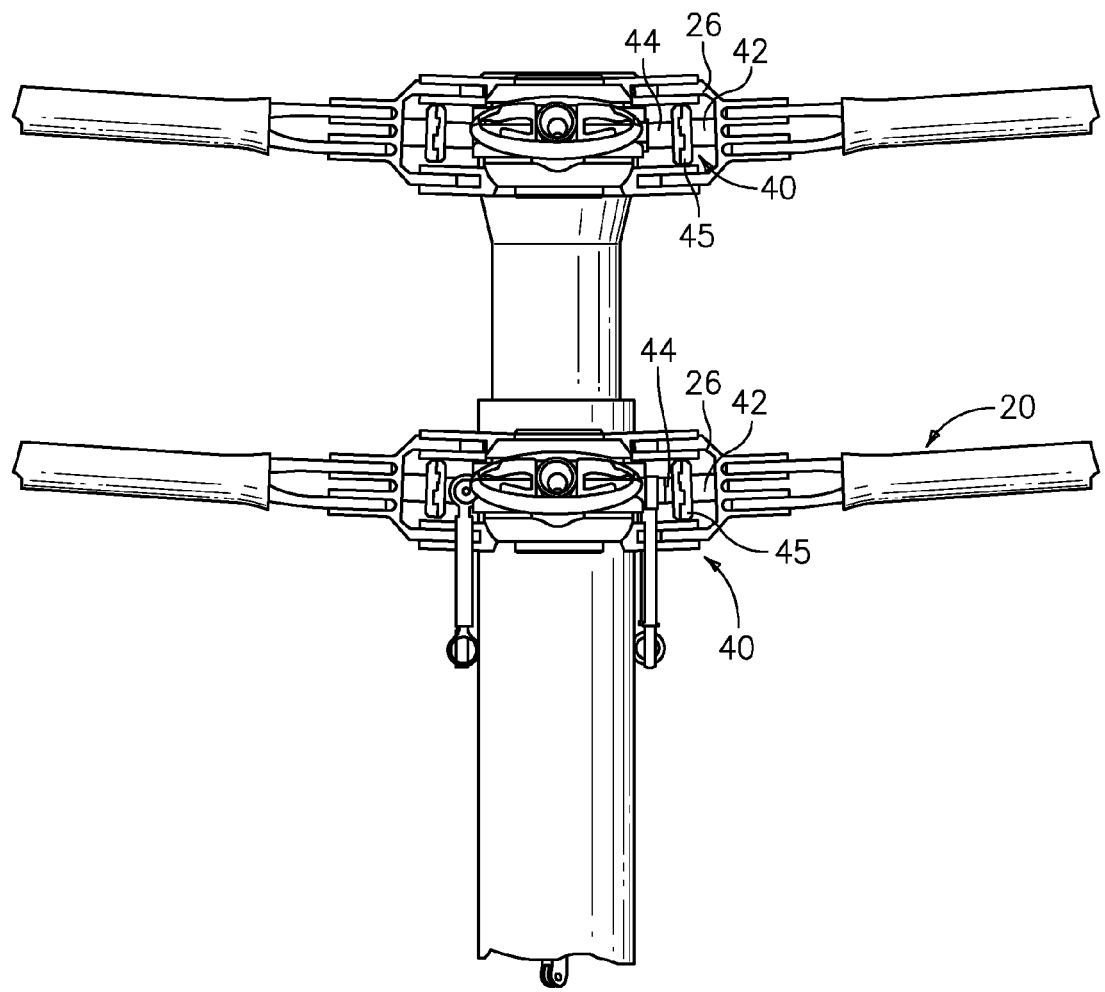
FIG. 3C is a side view of the upper and lower hub assembly of the dual, counter-rotating, coaxial rotor system.
Figure 3D:
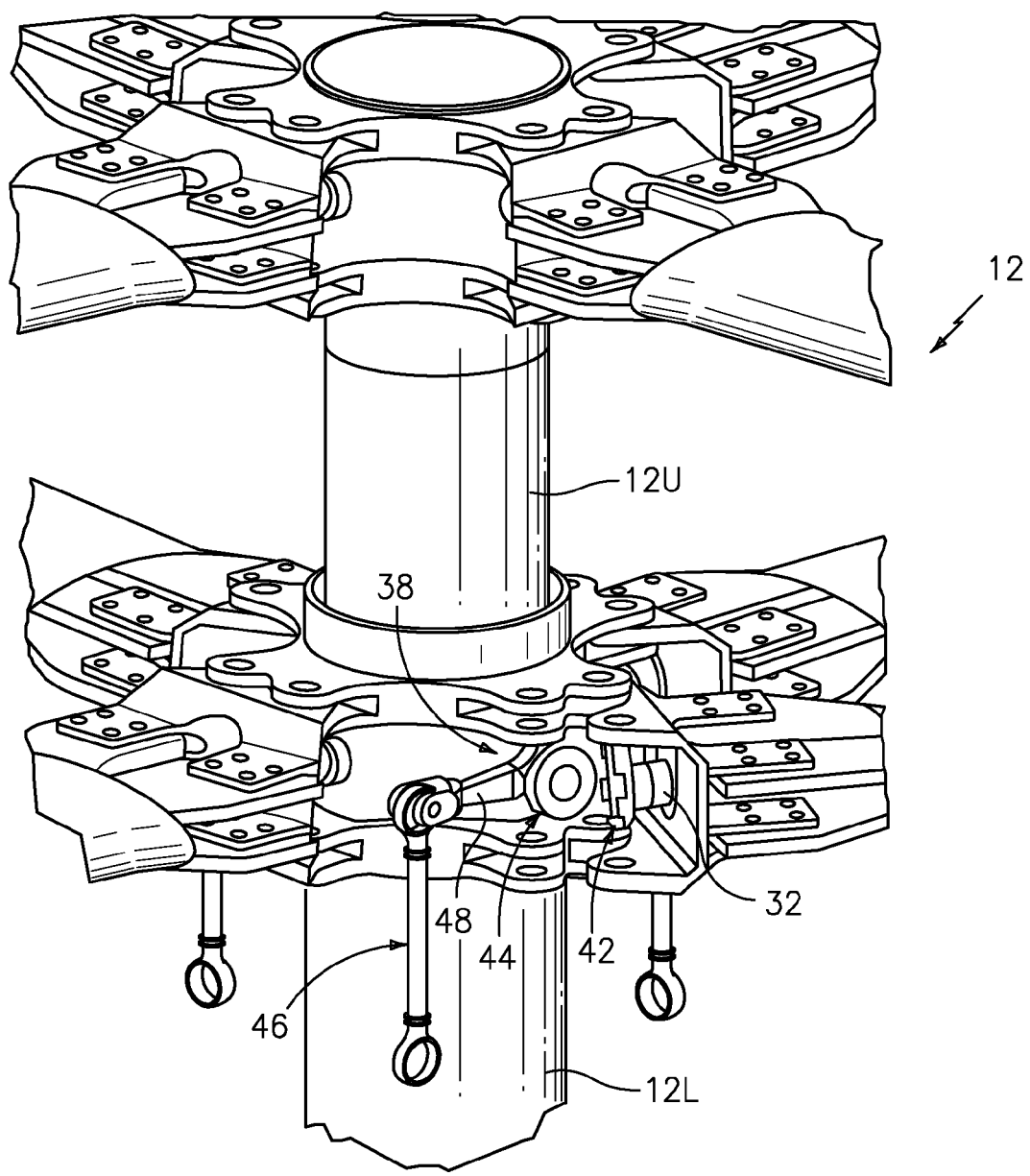
FIG. 3D is an expanded perspective view of the control system of the lower hub assembly of the dual, counter-rotating, coaxial rotor system in a folded position.

The upper rotor system 16 includes an upper rotor control system 36 (FIG. 3E) and the lower rotor system 18 includes a lower rotor control system 38 (FIG. 3D). A pitch control coupling assembly 40 (best seen in FIG. 3C) for each rotor blade assembly 20 includes a blade pitch control coupling 42 mounted for rotation with the pitch shaft 32 and a horn spindle coupling 44 rotationally mounted to the rotor hub assembly 22, 24. The blade pitch control coupling 42 rotationally engages the horn spindle coupling 44 at an interface 45 when the blade attachment 26 is in the flight position (FIG. 3A). The interface 45 may be a toothed interface as best illustrated in FIG. 3D or another interface to rotationally lock the blade pitch control coupling 42 with the horn spindle coupling 44 such that a pitch input to the horn spindle coupling 44 is transmitted to the blade pitch control coupling 42, the pitch shaft 32 and the flexbeam assembly 28.

Referring to FIG. 3D, the lower rotor control system 38 includes a pitch control rod 46 for each rotor blade assembly 20 that is linked with the horn spindle coupling 44 through a pitch control horn 48 to impart the desired pitch control to the pitch shaft 32 from a lower swashplate 50 (FIG. 2) or the like. It should be understood that the pitch control rod 46 may be located either internal or external the main rotor shaft of the rotor system 12. Typically, the pitch control rods 46 are external to the main rotor shaft 12L for pitch control of the lower rotor system 18 and internal to the main rotor shaft 12U for pitch control of the upper rotor system 16.

Figure 3E:
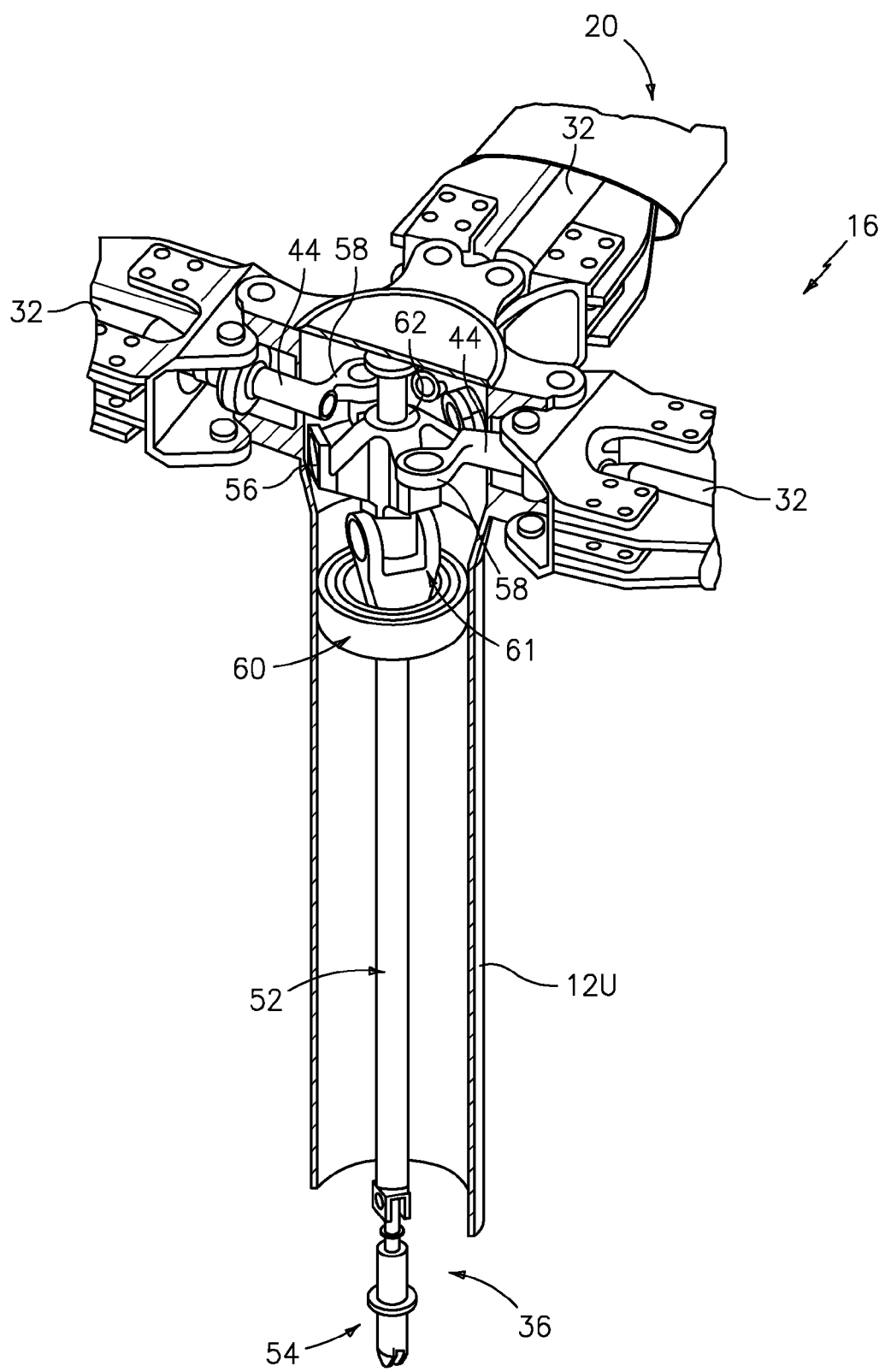
FIG. 3E is a perspective partial sectional view of an upper control system of the upper hub assembly of the dual, counter-rotating, coaxial rotor system.

Referring to FIG. 3E, the upper rotor control system 36 is preferably contained within the upper rotor shaft 12U which counter-rotates relative the lower rotor shaft 12L. The upper rotor control system 36 generally includes a relatively large diameter push rod 52 that is attached to a collective servo 54 at one end and to a pitch beam 56 at the other. The pitch beam 56 is connected to a pitch control horn 58 of the horn spindle coupling 44 to impart the desired pitch control to the pitch shaft 32 of each upper rotor blade assembly 20. It should be understood that the pitch control horn 58 and horn spindle coupling 44 are generally equivalent on both the upper and lower rotor system 16, 18.

Collective pitch into the upper rotor control system 36 is input by axial movement of the push rod 52. Cyclic pitch into the upper rotor control system 36 is input by an XY-positioner system 60 having two orthogonal servos which moves the push rod 52 off axis A to tilt the pitch beam 56 about a uniball 62 through a duplex bearing 61. It should be understood, that various upper and lower control systems including swashplates, pitch control rods and links at various locations may be utilized with the upper rotor control system 36 such that detailed description need not be further provided herein.

Figure 4A:
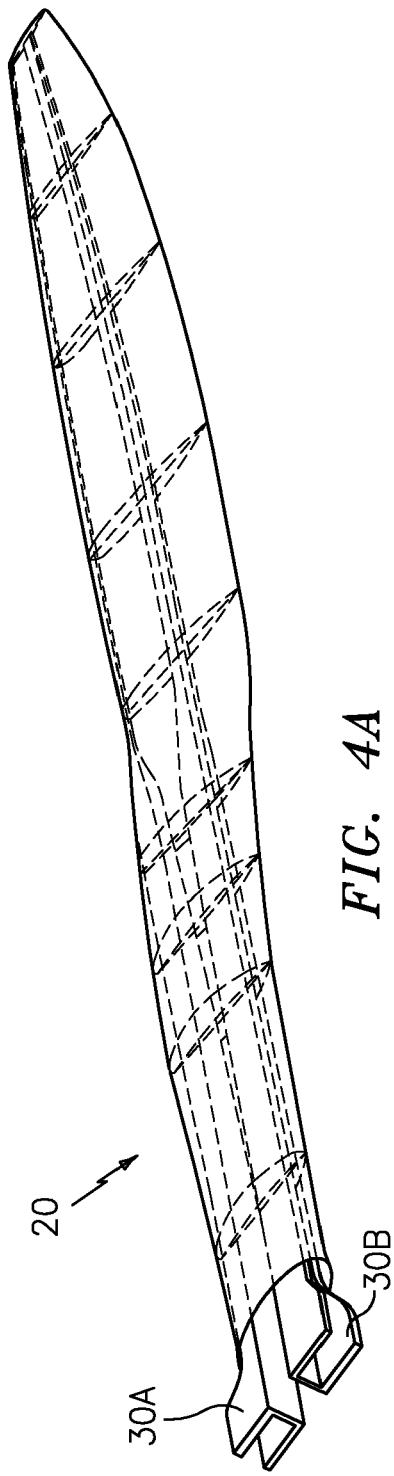
FIG. 4A is a perspective partial phantom view of a rotor blade assembly of the present invention.
Figure 4B:
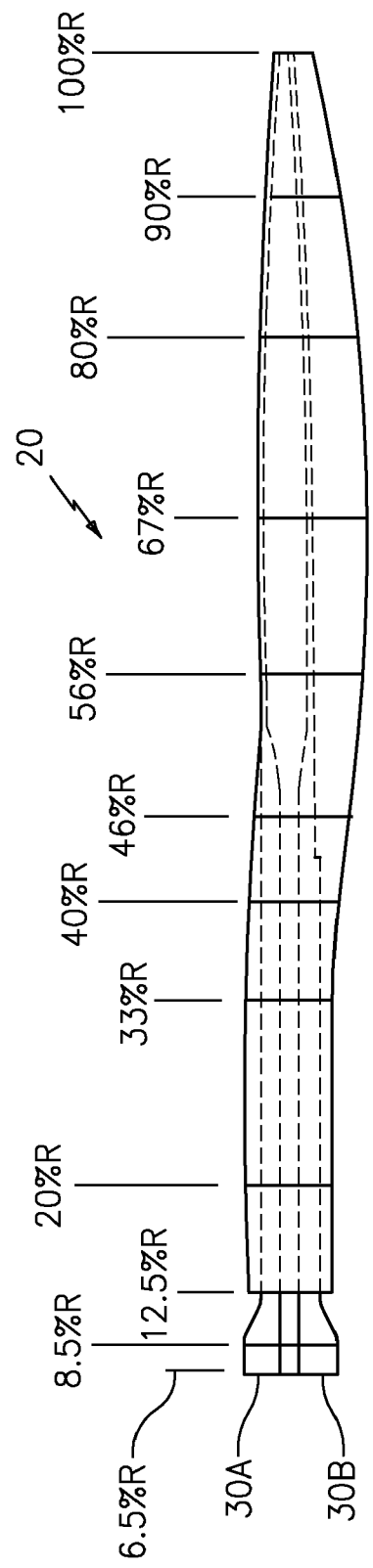
FIG. 4B is a top view of the rotor blade assembly of FIG. 4A illustrating radial stations of the rotor blade.
Figure 4C:
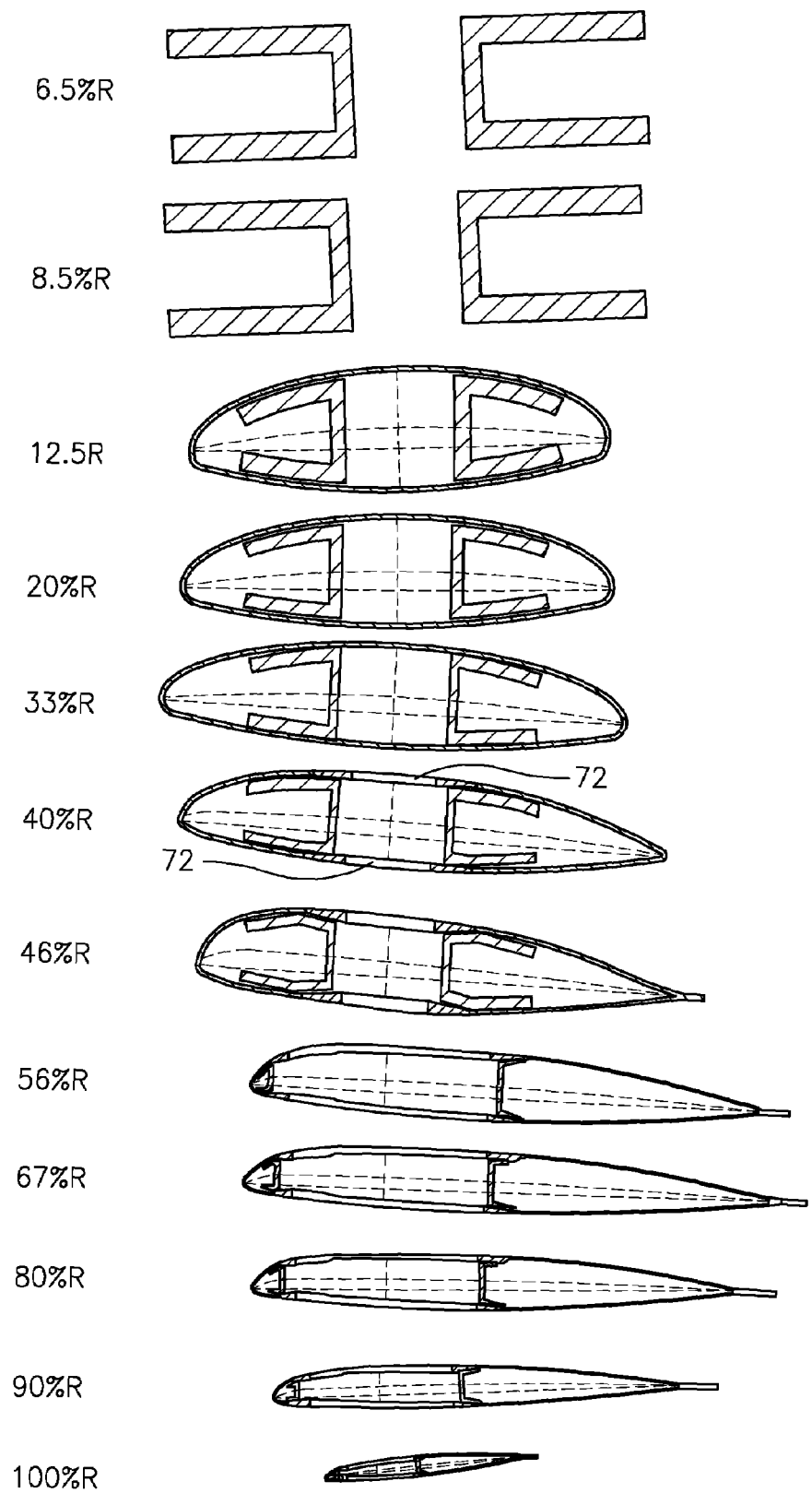
FIG. 4C is a sectional view of the rotor blade of FIG. 4A taken at each rotor blade station of FIG. 4B.

Referring to FIG. 4A, pitch inputs from the upper rotor system 16 and the lower rotor system 18 are transmitted to the respective rotor blade assembly 20 by the pitch shaft 32 channeled between the beams 30A, 30B and rigidly attached at an outboard rotor blade station which is preferably the 0.46 R station (FIG. 4B). It should be understood that the pitch shaft 32 may be attached at other radial stations. The beams 30A, 30B are preferably torsional-soft structures having a C-section (FIG. 4C). The C-section of the beams 30A, 30B allow for an elegant solution to high flapping stiffness requirements. This arrangement results in a structure with high stiffness without resorting to thick laminates, which may be of relatively significant weight.

Figure 4D:
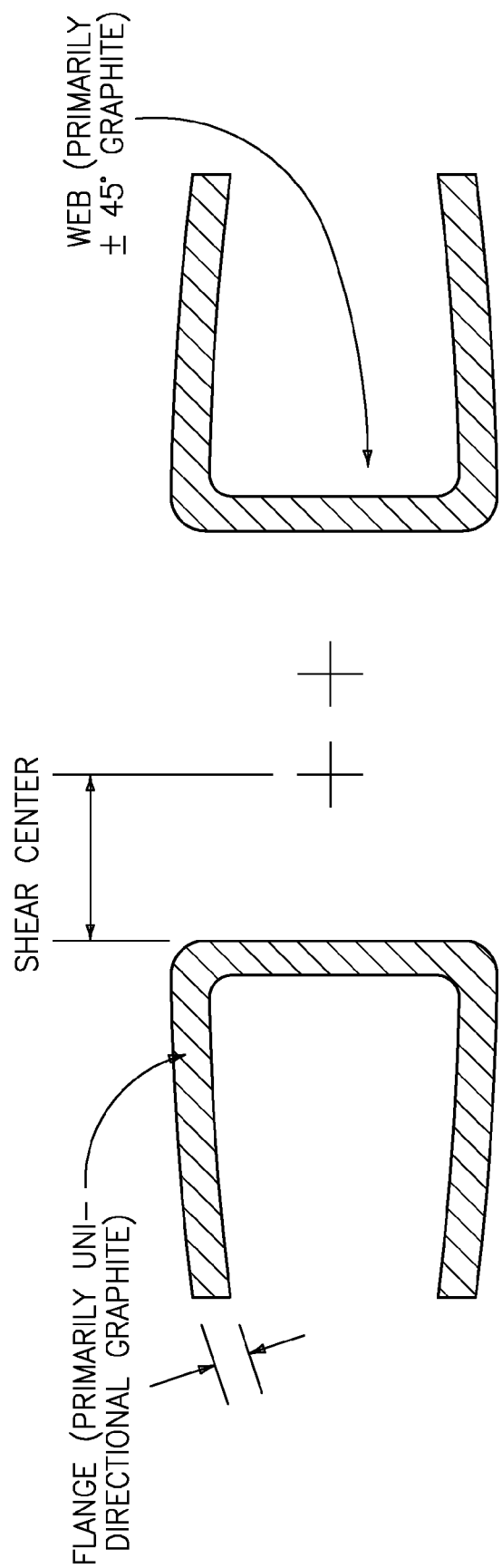
FIG. 4D is a sectional view of one rotor blade station illustrating a shear center position.

The material of the beams 30A, 30B are preferably tailored across the cross-section to achieve the desired behavior with the flanges being soft in torsion (mainly uni-directional plies) and the shear web being stiffer to react the shears that develop in that region (FIG. 4D). It should be understood that other cross-sections such as rectangular beams and I-beams may be utilized depending on a desired flap-softness and torsional stiffness.

Figure 4E:
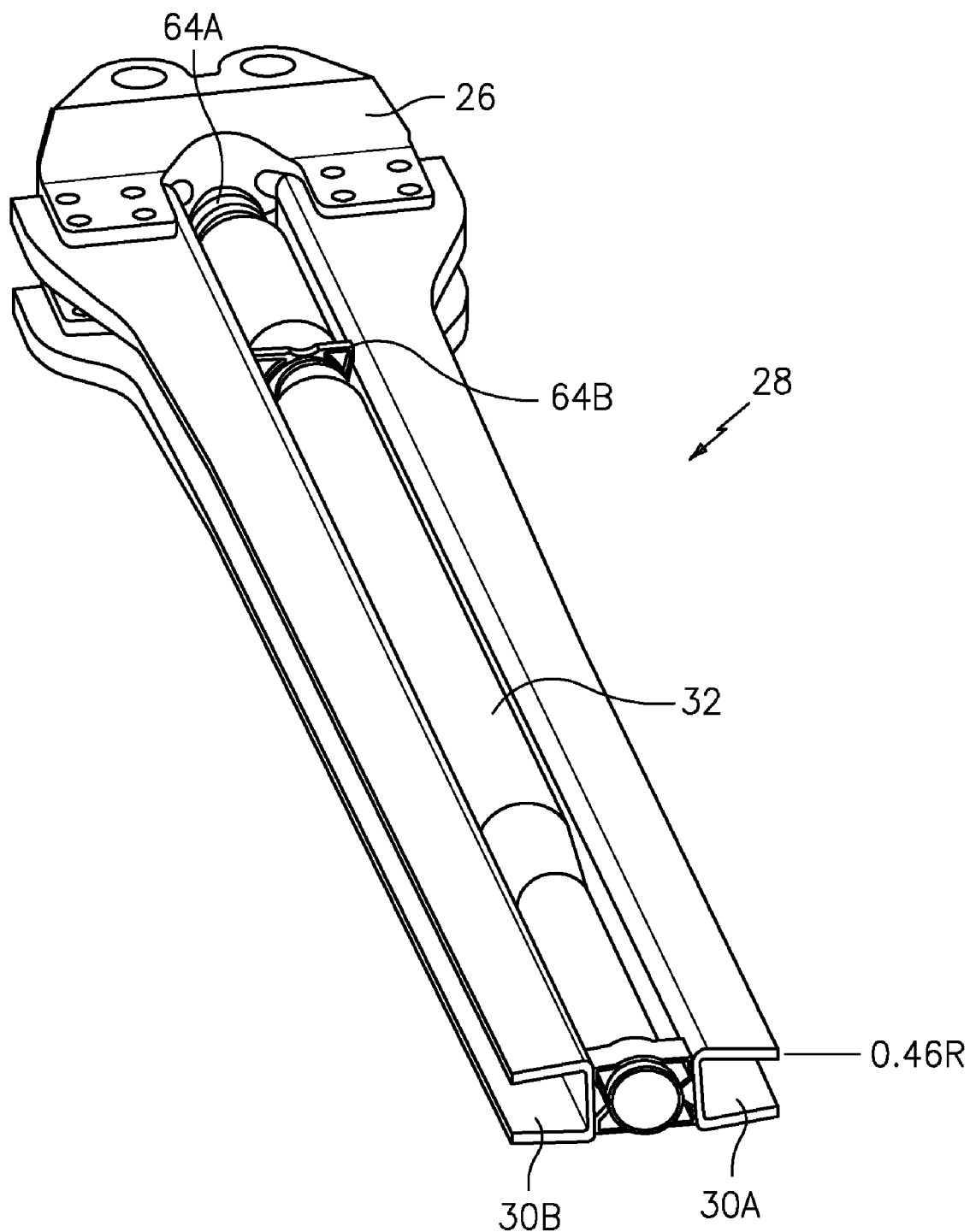
FIG. 4E is a top perspective view of a flexbeam assembly of the rotor blade assembly.

Referring to FIG. 4E, the beams 30A, 30B are spread apart to recover the pitch shaft 32 therebetween. This spacing also serves the purpose of moving the shear centers of the two beams closer to each other thus resulting in the softest option of the combined beams (see FIG. 4D).

Figure 4F:
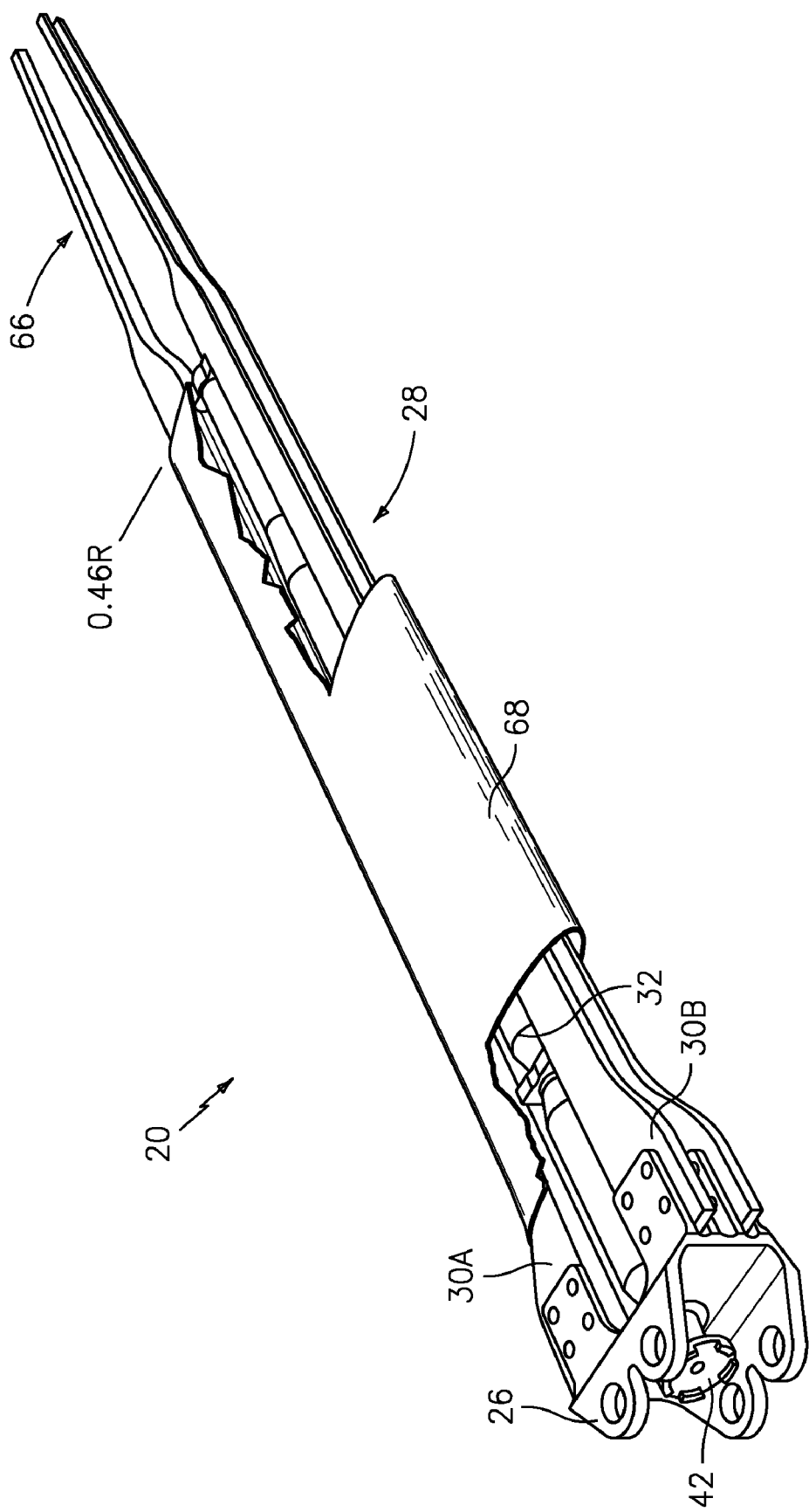
FIG. 4F is a perspective view of the rotor blade assembly similar to FIG. 4A illustrating the beams and pitch shaft arrangement of the flexbeam assembly and transition into the outboard rotor blade section with the beams morphing into a tubular spar which forms a torque box.
Figure 5:
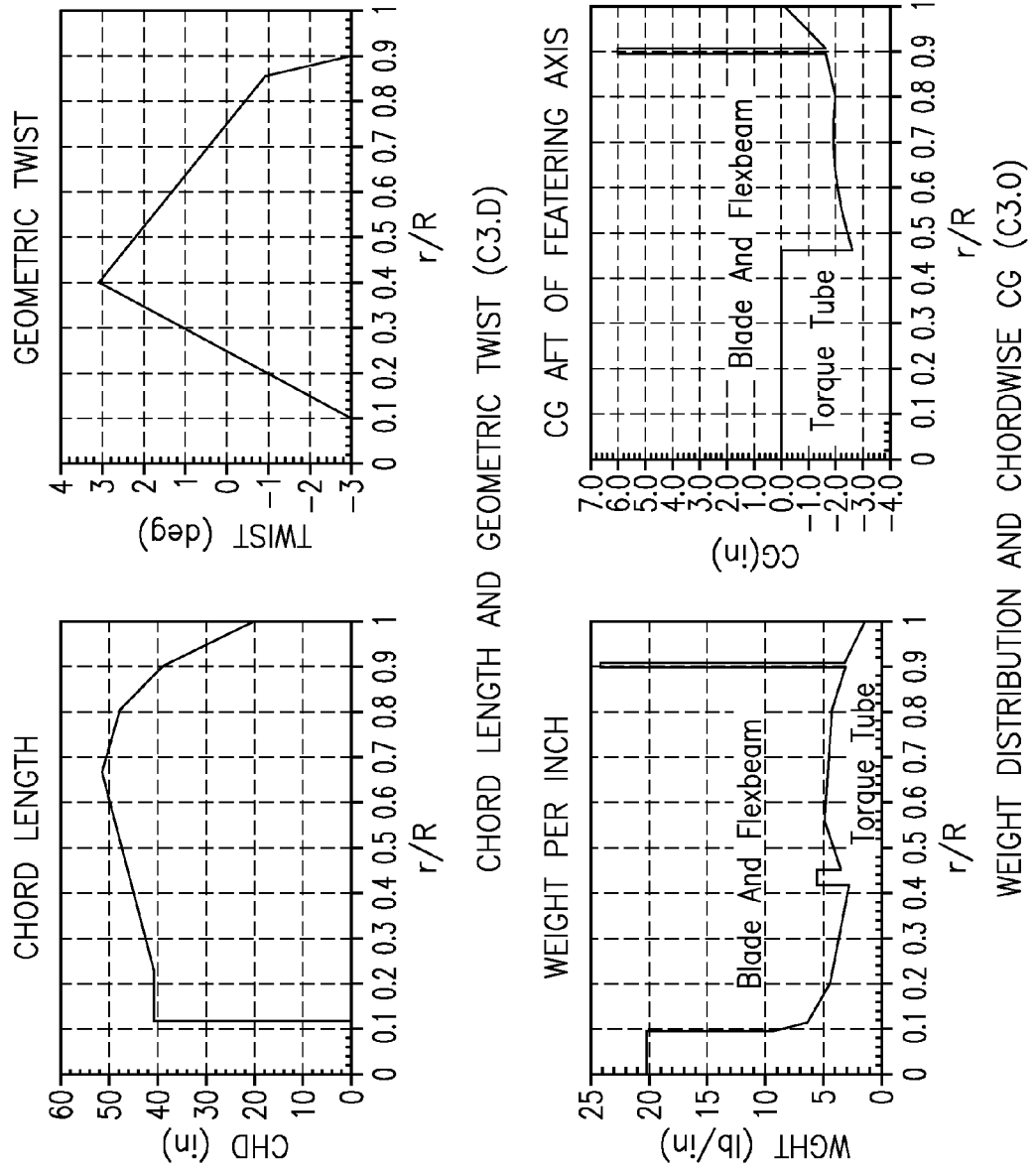
FIG. 5 are graphical representations of rotor blade characteristics.

The pitch shaft 32 provides a direct pitch input into the flexbeam assembly 28 at a relative soft section and replaces the heretofore required bulky torque tube with an efficient aerodynamic blade skin 68 (FIG. 4F) which need not be much larger than the flexbeam assembly 28 itself. This is especially advantageous in a high-speed rotary-wing aircraft in which the inboard sections of the retreating blade is in reverse flow as having a non-pitching airfoil results in a low-drag inboard section which is readily received in a sealed relationship with the respective upper hub fairing Fu and the lower hub fairing Fl (FIG. 2). It should be understood that the blade characteristics provided by the blade skin 68 may take various forms other than that which is preferred (FIG. 5).

The pitch shaft 32 is preferably a composite hollow tubular structure, which in one example is approximately 21 ft in length with an outer diameter of 10 inches and an average wall thickness of 0.5 inches. Due to the length and the function of the pitch shaft 32, the main design constraint is torsional stiffness. Shaft windup is preferably limited to one degree under the loads corresponding to 245 Kts cruise. For one embodiment of the flexbeam assembly 28, the pitch shaft 32 may be subjected to a maximum moment of 220,000 lb-in. This stiffness requirement is readily met by high modulus graphite (M60J) arranged in a ±45° orientation providing a stiffness comparable to steel at ⅙ its weight. The lower strain allowable of MJ70 as compared to IM7 is not a concern since the stiffness requirement results in low-strained structure.

Figure 4G:
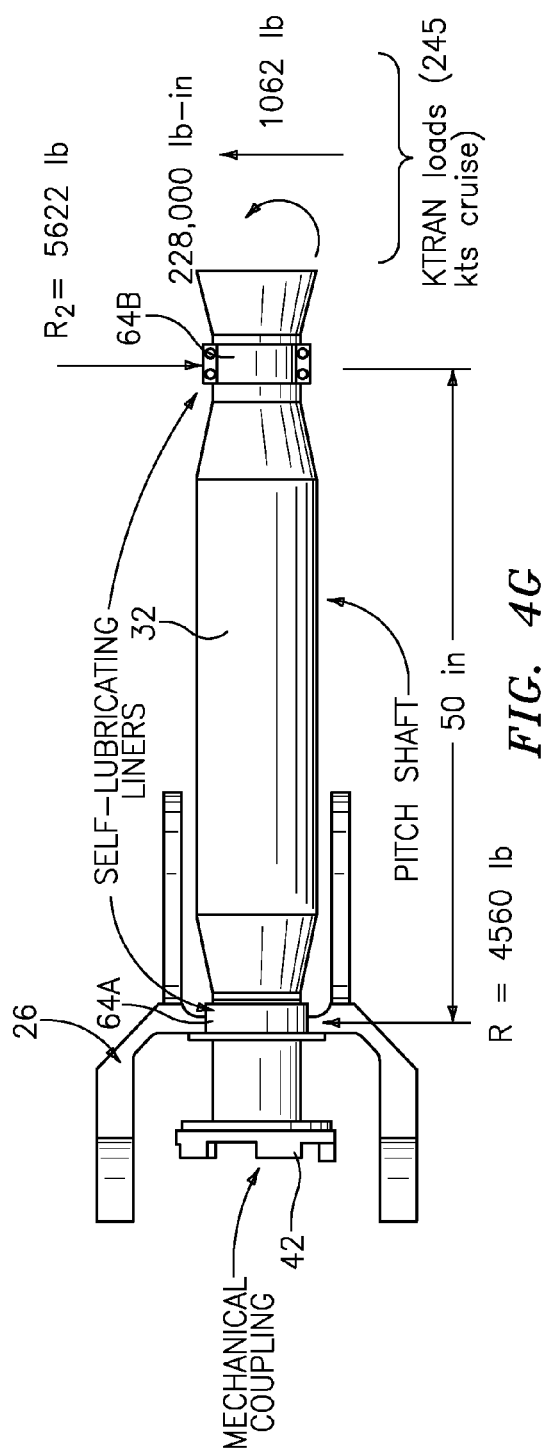
FIG. 4G is a side view of a mounting arrangement for the pitch shaft.

The pitch shaft 32 is preferably constrained by two self-lubricating bearings 64A, 64B (also illustrated in FIG. 4G). One bearing 64A is housed within the blade attachment 26 and the other bearing 64B is attached to the beams 30A, 30B. These bearings 64A, 64B serve a purpose similar to a snubber in a conventional torque-tube configuration and maintain the pitch shaft 32 coaxial with the blade pitch control coupling 42. Self-lubricating liners are well suited for this application due to the relatively low loads and small radius involved. With a spacing of 50 inches between the two bearings the maximum load required to react the combined flapping and chordwise moments and shears originating from the pitch shaft 32 is approximately 5,622 lb (FIG. 4G).

With an effective bearing area of 24 in² and a linear velocity at the bearing surface of 30 ft/m, the PV (effectively, power per unit area) is 7,028 psi-ft/min, which is well within the operating range of KAtherm T87S liners manufactured by Kamatics Corporation (a subsidiary of Kaman Corporation of Bloomfield, Conn. USA). Using a friction coefficient of 0.05, the heat generated at each bearing is estimated at 450 BTU/hr, which is comparable with the heat generation of typical pitch rod bearings (about 174 BTU/hr).

Referring to FIG. 4F, the rotor blade assembly 20 preferably defines the flexbeam assembly 28 inboard of 0.46 R and an outboard rotor blade section 66 outboard of 0.46 R. That is, outboard of the 0.46 R region, the beams 30A, 30B function as a forward and an aft web of a tubular spar (FIG. 4C). It should be understood that although the flexbeam to spar transition is illustrated at approximately 0.46 R in the disclosed embodiment, other outboard rotor blade stations will likewise be usable with the present invention.

The flexbeam assembly 28 and the outboard rotor blade section 66 are surrounded by the essentially contiguous outer aerodynamic blade skin 68. The outer aerodynamic blade skin 68 may include one or more sections to define a particular and changing airfoil at various span-wise sections (FIG. 4C).

Figure 4H:
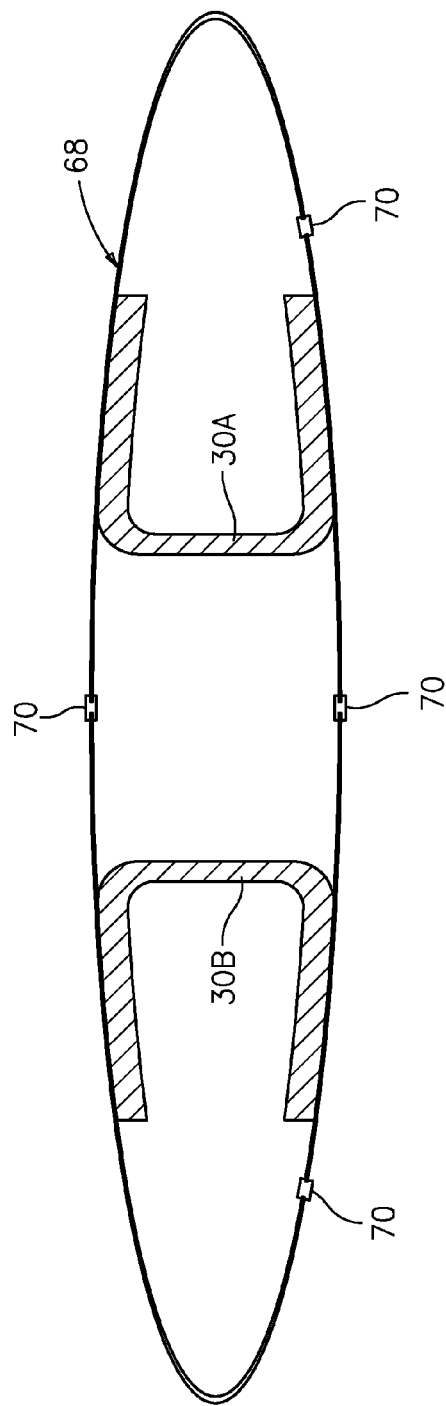
FIG. 4H is a sectional view of the flexbeam assembly illustrating resilient joint locations within the outer aerodynamic skin.

The outer aerodynamic blade skin 68 is attached to the flexbeam assembly 28, so the pitch motion of the rotor blade assembly 20 received at any rotor blade station is generally equal to the elastic angle of the flexbeam assembly 28 at that rotor blade station. The outer aerodynamic blade skin 68 is preferably elastically mounted to the flexbeam assembly 28 to provide minimum torsional stiffness to the flexbeam assembly 28 and preferably may include a multiple of resilient joints 70 to minimize any torsional stiffness effect (FIG. 4H).

Within or as a portion of the outer aerodynamic blade skin 68 and generally within the outboard rotor blade section 66, a shell laminate 72 forms an upper plate and a lower plate between the beams 30A, 30B to form a tubular torque box. Preferably, in the transition region between 0.33 R and 0.56, 0° and 45° plies are gradually added to the shell laminate 72 as they begin to carry more of the bending and torsion loads. Outboard of 0.46 R, the beams 30A, 30B are preferably bonded to the outer aerodynamic blade skin 68 to transfer the flatwise bending stresses from the flanges of the beams 30A, 30B into a thickened region of the shell laminate 72 between the beams 30A, 30B to pitch the outboard rotor blade section 66.

Figure 4I:
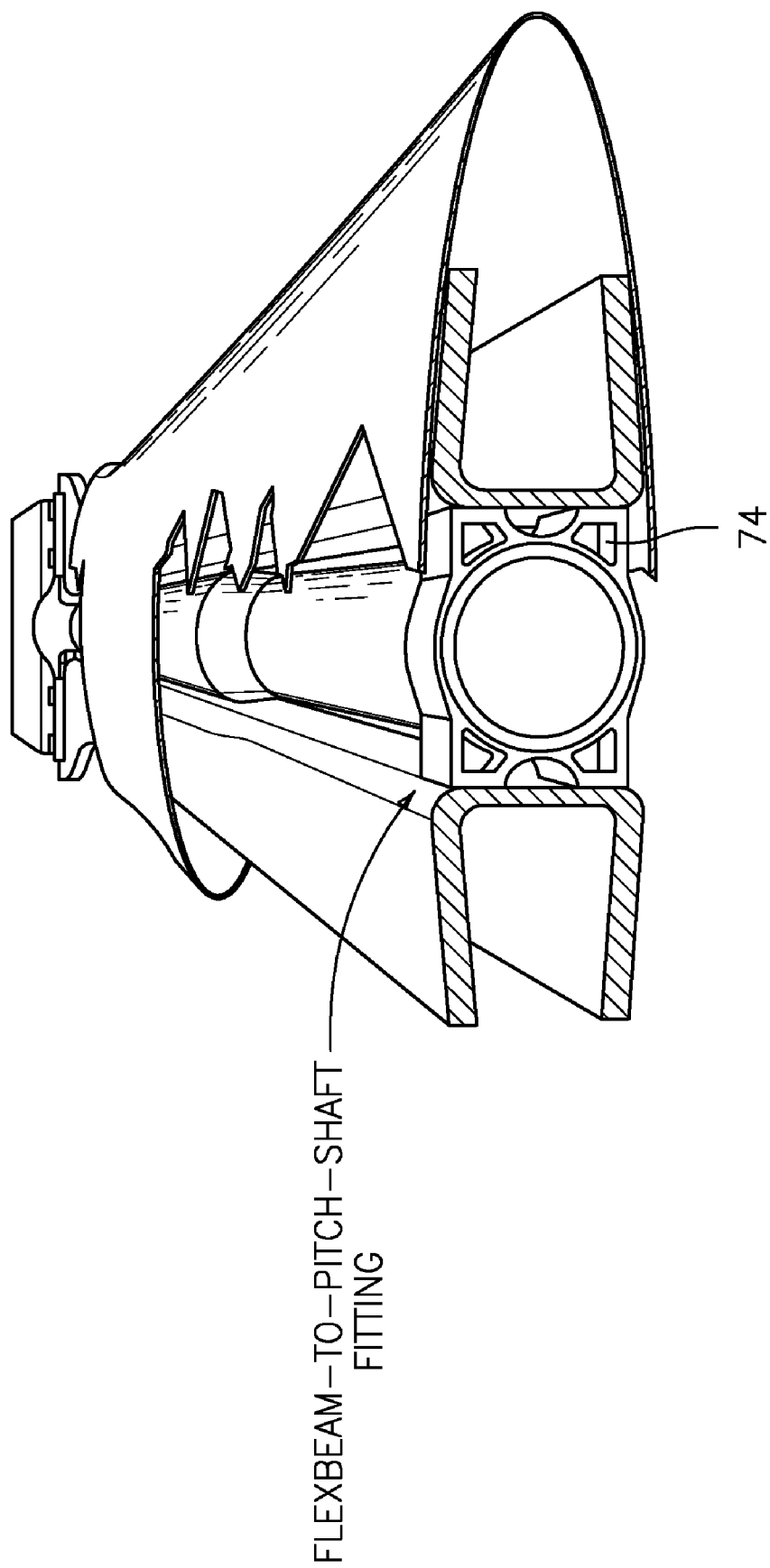
FIG. 4I is an outboard sectional view of the flexbeam assembly illustrating a pitch shaft fitting which fixes an outboard section of the pitch shaft to the beams.

The pitch tube 32 preferably terminates at 0.46 R, and is locally attached through a pitch shaft fitting 74 (FIG. 4I) outboard of the two self-lubricating bearings 64A, 64B, to the beams 30A, 30B to transfer the torsion therefrom. The shell laminate 72 thickness is preferably increased at in the 0.46 R region to support the loads from the pitch shaft fitting 74 which transfers the torsional forces from the pitch tube 32 to the beams 30A, 30B.

Figure 6:
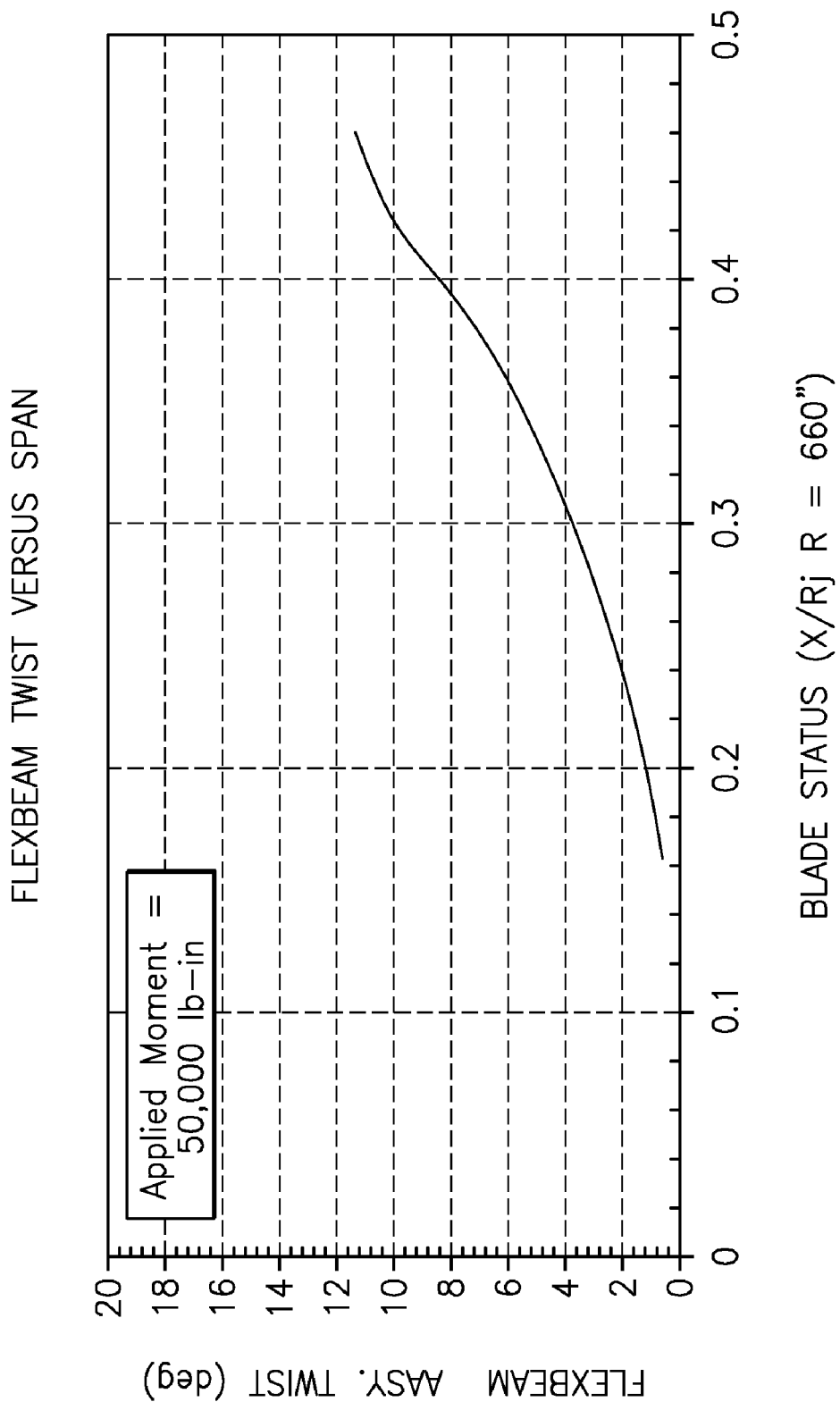
FIG. 6 is a graphical representation of the flexbeam assembly twist versus span.

The outboard section of the flexbeam assembly 28 receives the full pitch input from the pitch shaft 32 while the most inboard section of the flexbeam assembly 28 is essentially fixed in pitch by the blade attachment 26 to the rotor hub assembly 22, 24. That is, the flexbeam assembly 28 twist versus span is essentially linear from 0.0 R to 0.46 R (FIG. 6). The outboard rotor blade section 66 thereby also defines the pitch input from the 0.46 R station to the rotor blade tip equivalent to that at the 0.46 R station. In other words, the entire outboard rotor blade section is at the same pitch as the outermost station of the flexbeam assembly 28 where the pitch shaft 32 is attached through the pitch shaft fitting 74.

The beams 30A, 30B and pitch tube 32 arrangement allows the innermost sections of the flexbeam assembly 28 to avoid the pitch interference relationship and resultant thicker airfoil of a conventional flexbeam rotor blade such that a relatively thinner inboard airfoil may be utilized to provide a significant performance improvement for high speed bearingless rotors. Furthermore, as the innermost sections of the flexbeam assembly 28 is essentially fixed in pitch, the present invention facilitates rotor hub fairing sealing with the rotor control system, the rotor blade assembly and the rotor blade fold mechanism to minimizing critical hub drag and maximize aircraft high speed performance.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade assembly comprising:
   a first beam;
   a second beam;
   a pitch shaft rotationally mounted between said first beam and said second beam, said pitch shaft having a pitch shaft outboard section attached to said first beam and said second beam at an outboard rotor blade station such that a pitch input to an inboard section of said pitch shaft twists said first beam and said second beam at said outboard rotor blade station; and
   a blade attachment mounted to said first beam and said second beam, said pitch shaft extends through said blade attachment.

2. The assembly as recited in claim 1, wherein said pitch shaft is mounted within at least one bearing between said first beam and said second beam.

3. The assembly as recited in claim 1, wherein said pitch shaft outboard section is mounted to said first beam and said second beam at an outboard rotor blade station greater than 0.2 R.

4. The assembly as recited in claim 1, wherein said pitch shaft outboard rotor blade station is mounted to said first beam and said second beam at 0.46 R.

5. The assembly as recited in claim 1, further comprising an outboard rotor blade section outboard of said pitch shaft outboard section.

6. The assembly as recited in claim 1, wherein each of said first beam and said second beam morph into a rotor blade spar in a region adjacent to said pitch shaft outboard section.

7. The assembly as recited in claim 1, wherein each of said first beam and said second beam are C-shaped in cross-section.

8. The assembly as recited in claim 1, further comprising an outer aerodynamic skin mounted to said first beam and said second beam.

9. The assembly as recited in claim 8, wherein said outer aerodynamic skin includes a multiple of resilient joints to minimize a torsional stiffness thereof.

10. A rotor blade assembly comprising:
    a first C-shaped beam;
    a second C-shaped beam arranged in a back-to-back orientation with said first C-shaped beam;
    a blade attachment mounted to said first C-shaped beam and said second C-shaped beam;
    a pitch shaft fitting attached between said first C-shaped beam and said second C-shaped beam at an outboard rotor blade station; and
    a pitch shaft rotationally mounted through said blade attachment and between said first C-shaped beam and said second C-shaped beam, said pitch shaft having a pitch shaft outboard section attached to said pitch shaft fitting.

11. The assembly as recited in claim 10, wherein said pitch shaft fitting is mounted at greater than 0.2 R.

12. The assembly as recited in claim 10, wherein said pitch shaft fitting is mounted at 0.46 R.

13. The assembly as recited in claim 10, wherein each of said first C-shaped beam and said second C-shaped beam morph into a rotor blade spar in a region adjacent said pitch shaft fitting.

14. The assembly as recited in claim 10, further comprising an outer aerodynamic skin mounted to said first C-shaped beam and said second C-shaped beam.

15. A method of pitching a rotor blade assembly of a rotary-wing aircraft comprising the steps of:
    (A) inputting a torsional input into a pitch shaft at an inboard pitch shaft section at a root of the rotor blade assembly, the pitch shaft attached at an outboard rotor blade station to a first beam and a second beam; and
    (B) twisting the first beam and the second beam at the outboard rotor blade station in response to said step (A), the pitch shaft extending through the blade attachment which mounts the rotor blade assembly to a rotor hub assembly.

16. A method as recited in claim 15, wherein said step (B) further comprises:
    (a) twisting the first beam and the second beam in a generally linear manner from an inboard rotor blade station to the outboard rotor blade station.

17. A method as recited in claim 16, wherein said step (A) further comprises:
    (i) locating the outboard station at 0.46 R.

18. A method as recited in claim 15, wherein said step (A) further comprises:
    inputting the torsional input through a pitch control assembly of the rotor hub assembly.

* * * * *